United States Patent [19]

Lorthiois

[11] 4,063,709
[45] Dec. 20, 1977

[54] BUTTERFLY VALVE

[75] Inventor: Thierry Antoine Lorthiois, Laxou, France

[73] Assignee: Pont-A-Mousson S.A., Nancy, France

[21] Appl. No.: 619,123

[22] Filed: Oct. 2, 1975

[30] Foreign Application Priority Data

Oct. 18, 1974 France .................................. 74.35183

[51] Int. Cl.² ............................................. F16K 25/00
[52] U.S. Cl. .................................... 251/173; 251/306
[58] Field of Search ............................. 137/527, 527.4; 251/304, 305, 306, 307, 308, 172, 173

[56] References Cited

U.S. PATENT DOCUMENTS

| 2,863,630 | 12/1958 | Broz | 251/173 |
| 2,982,305 | 5/1961 | Grove | 251/173 X |
| 3,216,695 | 11/1965 | Bartholet | 251/173 |
| 3,409,269 | 11/1968 | Fawkes | 251/306 X |
| 3,612,483 | 10/1971 | Pool | 251/306 |
| 3,834,663 | 10/1974 | Donnelly | 251/173 |

Primary Examiner—Harold W. Weakley
Attorney, Agent, or Firm—Sughrue, Rothwell, Mion, Zinn and Macpeak

[57] ABSTRACT

The valve is of the type having a body and a butterfly valve closure member. One of these parts has an annular sealing element which is retained in a cavity with which it defines an annular chamber. The other part has an annular surface for contacting the sealing element when the valve is closed. A conduit puts the chamber in communication with the upstream side of the closure member when the latter is in its valve closing position. According to the invention, an exhaust conduit is provided for putting the chamber in communication with the downstream side of the closure member when, and only when, the closure member is not in its valve closing position.

13 Claims, 11 Drawing Figures

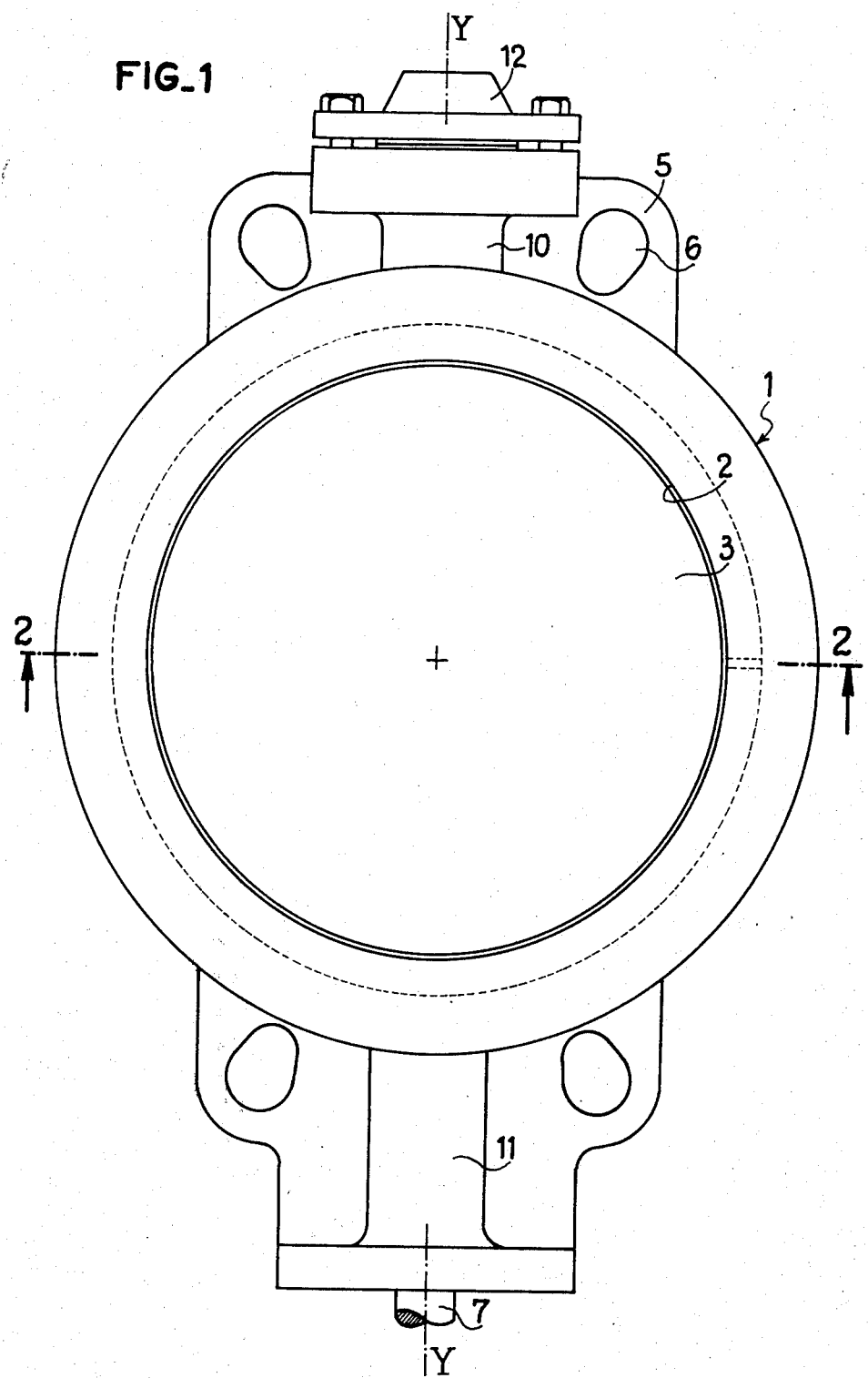
FIG_1

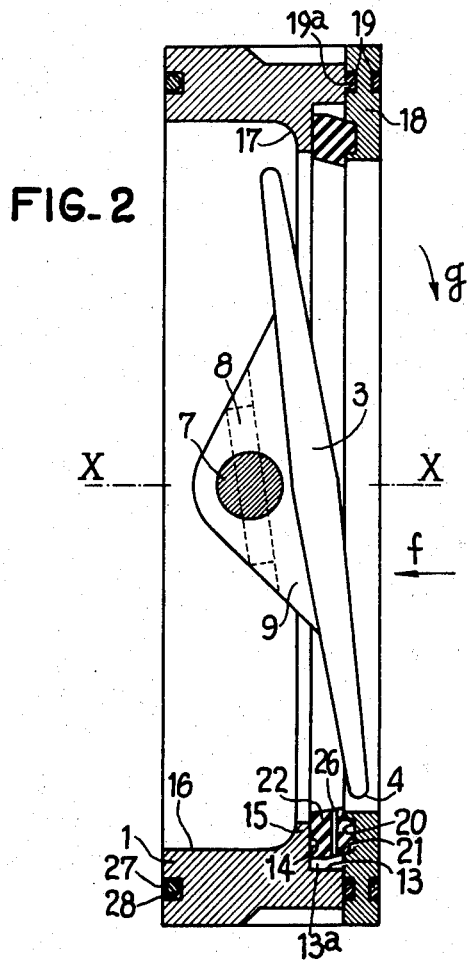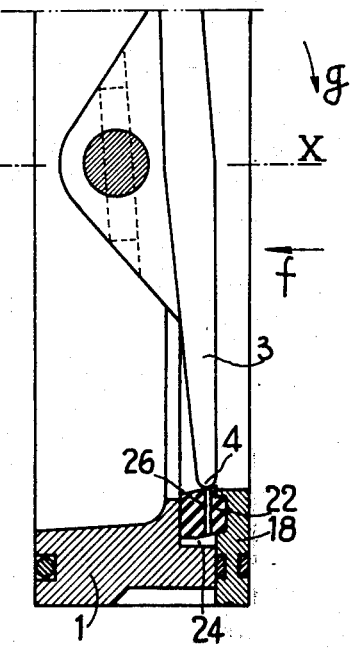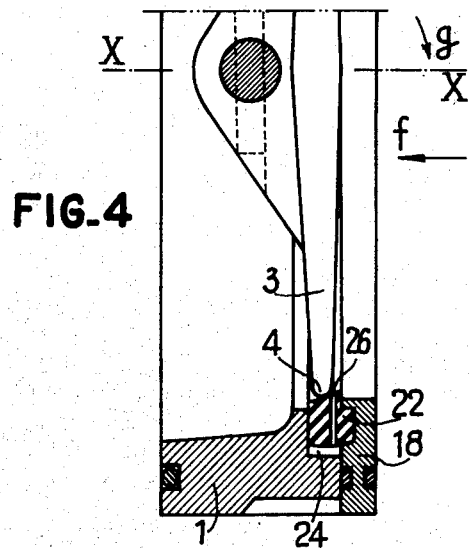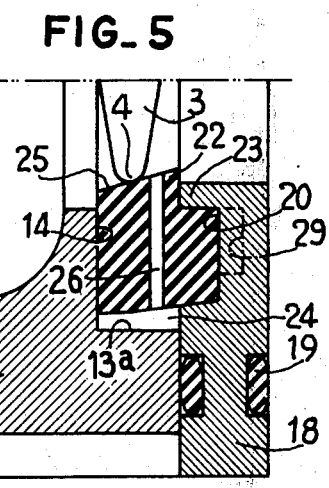

FIG._6
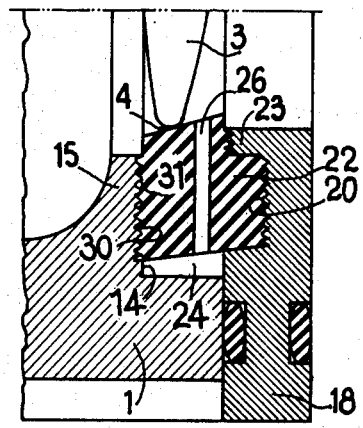
FIG._7
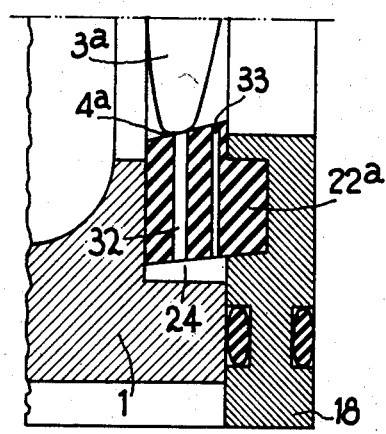
FIG._8
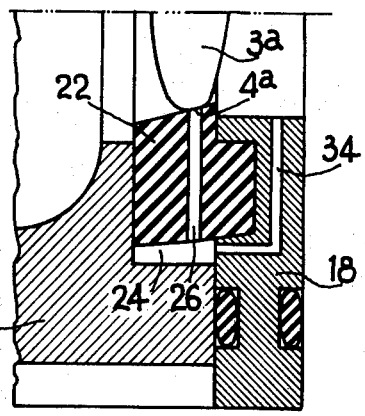
FIG._9
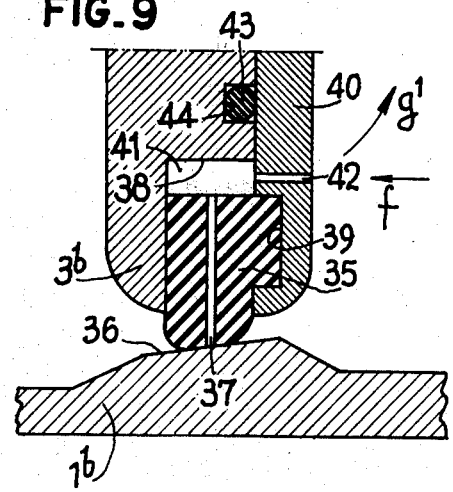
FIG._10
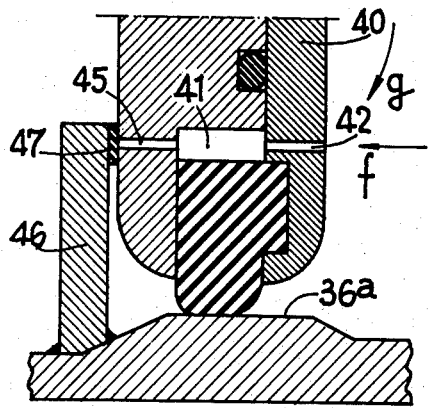

BUTTERFLY VALVE

The present invention relates to valves of the butterfly type and more particularly to valves of the type comprising a valve body and a butterfly valve closure member, one of these two elements being provided with an annular sealing element maintained by hooking means in a recess with the inner end of which recess it defines an annular chamber, the other element having an annular surface of contact with the sealing element, a conduit for putting the chamber under pressure directly connecting the chamber to the part of the valve which is upstream of the surface of contact when the butterfly valve member is in the valve closing position.

U.S. Pat. No. 2,982,305 discloses valves of the aforementioned type. The valve disclosed in this Patent has the drawback that as the annular chamber is constantly connected to the upstream part of the valve it produces a premature expansion of the sealing element when the butterfly valve member is closed.

Now, the expansion of the sealing element must only occur when the butterfly valve member reaches its extreme closing position. Indeed, when the butterfly valve member approaches this position (end of the closing) or when it is made to leave this position (beginning of the opening), the sealing element must be in a position of rest (non-expanded state) in order to allow the passage of the butterfly valve member with the minimum of friction and above all in order to ensure that for the extreme operating stages (end of the closure; beginning of the opening), the operating torque to be exerted by the servomotor is not excessively high.

An object of the present invention is to provide a butterfly valve of the aforementioned type which does not have the aforementioned drawback, that is to say which, while remaining simple in design, strong, small, easy to mount and to equip and giving sealing properties which permit under good conditions of use of the valve for flows having severe parameters (high temperature, high pressure, charged fluids or fluids of high density, pipes having a large diameter), ensures that the expansion of the sealing element only occurs when the butterfly valve member is in the extreme closing position.

According to the invention there is provided a butterfly valve of the aforementioned type comprising an exhaust conduit directly connecting the chamber to the downstream part of the valve when, and only when, the butterfly valve member is moved away from its extreme closing position.

Advantageously, the pressurizing conduit and the exhaust conduit are provided at one of two points which are the most remote from the axis of rotation of the butterfly valve member, and preferably said point is that of the two points the most remote from the axis of rotation of the butterfly valve member which is downstream of the corresponding part of the edge of the butterfly valve member when the latter is in the vicinity of its closing position.

In the latter case, in one embodiment of the invention, the pressurizing conduit and the exhaust conduit are constructed in the form of a single conduit formed substantially radially in the sealing element.

In another embodiment of the invention, the exhaust conduit and the pressurizing conduit are formed in the sealing element in the same radial half plane, the exhaust conduit being disposed in such manner as to be closed by said surface of contact when the valve member is in the closing position, the axial dimension of the part of the sealing element separating the two conduits exceeding the axial dimension of said surface of contact.

Further features and advantages of the invention will be apparent from the ensuing description given by way of example with reference to the accompanying drawings, in which:

FIG. 1 is an elevational view of a butterfly valve according to the invention;

FIG. 2 is a sectional view taken on line 2—2 of FIG. 1, the valve being in a first position close to the closing position thereof;

FIG. 3 is a partial view similar to FIG. 2, the valve being in a second position close to the closing position;

FIG. 4 is a view similar to FIG. 3, the valve being closed;

FIG. 5 is a view to an enlarged scale of a part of the valve shown in FIG. 4;

FIGS. 6, 7, 7A and 8 are views similar to FIG. 5 of four modifications of a valve according to the invention, and FIGS. 9 and 10 are partial sectional views of valves according to two other embodiments of the invention.

Figure 7A:
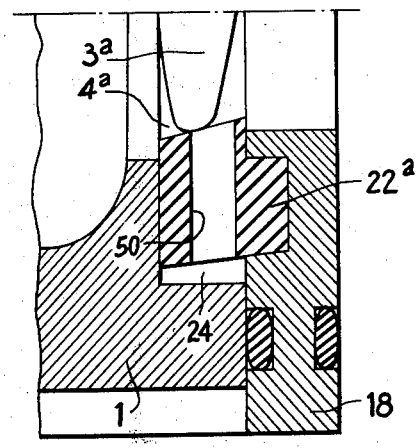

In the embodiment shown in FIGS. 1-5, the invention relates to a valve of the butterfly type comprising a body 1 through which extends a flow passage 2 having a generally cylindrical shape and an axis X—X. This flow passage can be closed by a closure or butterfly valve member 3 having the general shape of a disk which tapers to its periphery and has on this periphery an edge 4 which is relatively thin and rounded.

The body 1 has two pairs of peripherial ears 5 which are diametrally opposed and are each provided with an aperture 6 and form flanges for mounting the valve, by bolts or the like, between two aligned tubular elements having a common axis X—X of the piping (not shown) to be equipped with the valve.

The butterfly valve member 3 is secured to a shaft 7 having an axis Y—Y perpendicular to the axis X—X by at least one pin 8 which extends through the shaft 6 and bears in a complementary recess provided in at least one ear 9 integral with the valve member.

The shaft 7 extends through the valve body 1 in a sealed manner and outside the body it is guided inside two sleeves 10 and 11 which are integral with the body and in which there are provided means for preventing axial movement of the shaft 7 and for sealingly guiding the latter which is thus mounted to rotate about the axis X—Y. The sleeve 10 is closed by a bolted cover 12. The shaft 7 extends through the sleeve 11 and outside the latter it is connected to the output shaft of a servomotor or to the driven shaft of a transmission mechanism whose driving shaft is driven manually. The manual or servomotor means for driving the shaft 7 in rotation have not been shown.

When the valve is open, the fluid flows in the direction of arrow f and the valve is closed by rotating the valve member 3 in the direction of arrow g.

With respect to the direction of flow just defined, the body 1 has internally, in the downstream direction, an L-section annular recess 13, defined by the upstream face 14 of an inner radial flange 15, followed by a substantially cylindrical part 16 having a diameter slightly less than the radially inner end 13a of the recess 13 and connected by a rounded portion 17 to the downstream surface of the flange 15.

A ring 18 is applied on the upstream side against the end surface of the valve body 1 and secured to the latter by any suitable means (not shown). This ring 18, provided on its two sides with annular sealing elements 19 disposed in grooves 19a, has on its downstream side a recess 20 having a substantially rectangular sectional shape whose wall 21, which is radially the outermost wall, is of a diameter slightly less than the diameter of the radially inner wall 13a of the recess 13 in the valve body 1. The inside diameter of the ring 18 is slightly less than that of the flange 15. When the ring 18 is mounted on the valve body, it may be considered at being part of the valve body.

The recess 13 and the recess 20, which face each other, thus define a cavity in which there is disposed an annular sealing element 22 of elastomer material.

The element 22 has in cross section the general shape of an L whose horizontal branch (as viewed in FIGS. 3-5) is received in a recess 20 of the ring 18. It is clamped in the direction X—X between the end of the recess 20 of the ring 18 and the upstream surface 14 of the flange 15 of the body 1. The shoulder 23 defined between the recess 20 and the inner surface of the ring 18 prevents the sealing element from being expelled from its cavity. The inner surface 25 of the sealing element is substantially tangent to the sphere which is described by the periphery of the butterfly valve member in the course of the rotation of the latter.

The section of the sealing element 22 is in part complementary to that of its cavity but a chamber 24 is defined in this cavity between the radially inner end 13a of the latter and the outer slightly curved peripheral surface of the sealing element 22 which has a diameter less than that of the inner end 13a of the recess 13.

This chamber 24 is put in communication with the interior of the valve body when the valve opens, or only with the upstream part of the valve body when the valve is closed, by way of a single orifice or conduit 26 which is roughly radially disposed and formed in the sealing element 22. This orifice 26 of substantially circular section is formed in the element 22 at one of two points of the latter which are the most remote from the axis Y—Y of the shaft 6 of the valve member 3 and only at that of these two points which (bearing in mind the direction of flow f and the direction of closure g of the valve member) is downstream of the edge 4 of the valve member when the latter is in a position close to the closing position shown in FIG. 2. On the other hand, the orifice 26 is disposed very near to the upstream edge of the sealing element so that it is upstream of the valve member 3 when the latter is in the completely closed position shown in FIGS. 4 and 5.

Thus the direction of rotation of the valve member 3 is such that its edge 4 passes across the orifice 26 from the upstream to the downstream side thereof at the end of the closure and from the downstream to the upstream side at the beginning of the opening, as can be seen in FIG. 3.

The mounting of the ring 18 on the valve body 1 and the mounting of the valve in the piping to be equipped with the valve are achieved in a sealed manner by the use of annular sealing elements 19 of the ring 18, and of a similar sealing element 27 disposed in a recess 28 which is formed in the downstream end surface of the body 1.

The valve member 3, the valve body 1 and the clamping ring 18 are cast parts whose operative portions are machined. Depending on the use to which the valve is put, it is possible to construct the latter of various materials.

The valve just described operates in the following manner (FIGS. 2-5):

When the valve is open, the chamber 25 communicates with the interior of the valve body through which the fluid flows by way of the orifice 26. The pressure exerted on the inner and outer surfaces of the sealing element 22 is the same and as these surfaces are substantially equal, the sealing element is in a state of rest. When the valve is closed by rotating the valve member 3 in the direction of arrow g, the valve member assumes the position close to closure shown in FIG. 2. The sealing element 22 is in its upper part (as viewed in FIG. 2) upstream of the valve member and in its lower part, that is to say in the vicinity of the orifice 26 of the sealing element, downstream of this valve member. The orifice 26 is downstream of the valve member 2 and the chamber 24 is therefore in communication, by way of this orifice 26, with the downstream pressure. Consequently, the lower part of the sealing element 22 located downstream of the valve member is subjected on its inner surface 25 and on its outer surface located in the chamber 24 to pressures which are both equal to the downstream pressure. This part of the sealing element is therefore in a state of rest. On the other hand, the upper part of the sealing element, which is devoid of an orifice, is subjected on its inner surface to the upstream pressure whereas its outer surface is subjected to the downstream pressure which is the pressure prevailing in the chamber 24. As the downstream pressure is lower than the upstream pressure, this part of the sealing element is urged toward the radially inner end of its cavity which facilitates the closing movement of the butterfly valve member and reduces the friction of the edge of the latter against the sealing element.

When the valve member comes in contact with the sealing element (FIG. 3), its edge 4 passes over the orifice 26 and closes it. The valve is so designed that the valve member 3 comes in contact with the sealing element 22 in the region of the inner outlet of the orifice 26, or slightly upstream thereof, bearing in mind the state of rest, or slightly retracted state, of the sealing element. In this position, the valve is closed but in an unsealed manner. It will be assumed hereinafter that when the valve is closed, the downstream pressure is negligible with respect to the upstream pressure.

The valve member 3 is then continued to be rotated and the edge 4 of the valve member passes beyond the outlet of the orifice 26 and thus has for effect to put the chamber 24 in communication with the pressure prevailing upstream of the valve member 3. This upstream pressure acts on the whole of the outer peripheral surface of the sealing element and only on the part of the inner surface 25 which is upstream of the valve member. The difference between the surfaces on which the upstream pressure acts inside and outside causes the sealing element 22 to expand radially in the direction of the axis X—X. The sealing element 22 is thus pressed against the periphery 4 of the valve member 3 and the seal is achieved.

When the valve is opened, the reverse phenomena occur as soon as the edge of the butterfly valve member passes beyond the outlet of the orifice 26 by rotation in the direction opposed to arrow g, the pressure in the chamber 24 is relieved and the valve member can continue its rotation with the minimum of friction.

It is important to note that the extreme closing position of the valve member 3 (FIG. 4) is such that its edge 4 is very near to the downstream side of the orifice 26 so as to limit to the maximum extent the travel of the valve member effected during the time that the chamber 24 is under pressure and to decrease to the maximum extent the part of the inner surface of the sealing element subjected to the upstream pressure in the closing position of the valve member. This permits limiting to the maximum extent the range of angles of rotation in respect of which the required actuating torque is rather high and moreover increasing the efficiency of the seal produced by the expansion of the sealing element.

The invention has a number of advantages and in particular:

The chamber 24 is put under pressure and this pressure is relieved without a circuit outside the valve, and without a distributing system synchronized with the movement of the butterfly valve member. It is indeed the valve member which performs these two functions of distribution and synchronization and notwithstanding its cheap and extremely simple design, the valve has excellent sealing properties.

Owing to the simplicity of its design and operation, the valve according to the invention requires no maintenance or inspection and can stand up to a great number of actuations.

The position of the orifice 26 is provided at one of the two points the most remote from the axis of rotation Y—Y of the valve member 3 whereby it is possible to have at this point, for a given angle of rotation, the greatest linear displacement of the edge 4 of the valve member. This properly enables the orifice 26 to be placed very close to the closing position of the valve member, thereby limiting to the maximum extent of the movement of the valve member 3 under the expanded condition of the sealing element 22. Moreover, owing to the arrangement of the orifice 26 downstream of the butterfly valve member, when the latter is about to arrive at the closing position, the sealing element contracts on its own when the valve member approaches it. It will be observed that if the orifice 26 were provided in a diametrally opposed position (in the upper part of FIG. 2), the chamber 24 would be subjected to the upstream pressure at the approach of the valve member. Consequently, the lower part of the sealing element would be subjected internally to the downstream pressure and externally to the upstream pressure, which would result in a radially inward expansion thereof before it comes in contact with the valve member which would then increase instead of decreasing the required actuating torque.

It must also be noted that, in the closed position, the action of the upstream pressure on the sealing element 22 is the higher as the upstream pressure is higher. Thus, the valve according to the invention may be employed for high pressure flows, the seal obtained being still better under these conditions.

The "dynamic" seal provided by the sealing element 22 permits compensating for possible phenomena of flow or creep of the elastomer of the sealing element 22. These flows are frequent and considerable in respect of fluids at high temperature and the valve according to the invention could be employed with advantage under such conditions.

The presence of the chamber 24 permits avoiding the positioning and centering of the sealing element with respect to the inner end 13a of the cavity. This arrangement permits compensating for possible faulty centering of the cavity due, in particular, to the moulding of the body 1 and the ring 18. The sole centering to be employed upon assembly is the introduction of the horizontal branch of the L-shaped of the sealing element in the recess 20 in the ring 18. Further, this purely mechanical hooking of the sealing element does not hinder the deformation of the latter caused by the pressure in the chamber 24.

The invention may be applied easily to existing conventional valves comprising an annular sealing element mounted and clamped in a corresponding cavity in the body of the valve. It is sufficient to adapt to these valves a sealing element which defines with the inner end of the cavity receiving it a chamber, such as 24, then to locate the extreme position of the valve member and to provide a conduit or orifice, such as 26, very close to the edge of the valve member, upstream of the latter, and at one of two points the most remote from the axis of rotation of the valve member, namely at that of these two points which is downstream of the edge of the valve member when the valve member is close to its closing position.

In FIG. 5 there is shown in dotted line an annular recess 29 having a rectangular cross-sectional shape formed in the inner end of the recess 20 of the ring 18. This recess 29 is connected to the chamber 24 when the sealing element comes slightly away from the ring 18 when the sealing element is urged inwardly in the closed position of the valve. The recess 29 thus provides, when it is filled with fluid at the upstream pressure, an additional force which contributes to the expansion of the sealing element and increases the sealing effect.

In the modification shown in FIG. 6, the edge of the shoulder 23, the inner end of the recess 20 of the ring 18, and the upstream surface 14 of the flanges 15 are provided with circular grooves 30 having an axis X—X. These grooves 30 form therebetween circular sharp edges 31 which permit achieving an improved retention or hooking of the sealing element 22 inside its cavity and effectively preventing its expulsion when the pressure prevailing inside the chamber 24 is high.

FIG. 7 shows another modification of the invention, of use preferably with a butterfly valve member 3ª having a relatively wide edge 4ª. In this modification, the sealing element 22ª has two roughly radial orifices or conduit 32 and 33 which are located in the same radial half plane as the orifice 26 shown in FIG. 2. The orifice 32 has a cross section greater than that of the orifice 33 and is located downstream of the latter, and more precisely facing of the edge 4ª of the butterfly valve member in the final position thereof, so that in this position of the valve member the latter closes the orifice 32.

This modification operates in the following manner:

When the edge 4ª of the valve member 3ª is between the orifices 32 and 33 in a position close to the closing position, the fluid of the piping enters the chamber 24 by way of the orifice 33 and escapes therefrom by way of the orifice 32. As the latter orifice is of larger section than the orifice 33, the chamber 24 is not pressurized and the sealing element is in its state of rest. The pressurizing of the sealing element by way of the orifice 33 only occurs in this case when the valve member closes the orifice 32 and is thus located in its extreme closing position.

By way of a modification and as shown in FIG. 7A, instead of two orifices 32 and 33 there may be provided a single orifice or conduit 50 having an oblong section which is elongated in the direction of axis X—X and has a length which is sufficient to ensure that there is a position of the valve member in which the edge of the latter allows the fluid to enter on the upstream side and to escape on the downstream side, this outlet part of the oblong orifice being closed in the fully closed position of the valve member as shown in FIG. 7A.

Owing to the arrangement of these last two modifications, the travel of the valve member effected when the chamber 24 is under pressure and the sealing element is expanded is still further reduced, above all when the edge of the valve member is relatively wide.

The modification shown in FIG. 8, in which the sealing element 22 is identical to that shown in FIGS. 2-6, is such as to replace the orifice 33 shown in FIG. 7 by a passageway 34 formed in the ring 18 in the same half plane and opening, at one end, onto the radially inner peripheral surface of this ring 18, and, at the other end, onto the chamber 24. In this case also, the valve is so designed that the final closing position of the valve member corresponds to the position of the latter in which its edge 4$^a$ closes the orifice 26. As before, the diameter of the passage 34 is less than that of the orifice 26 in order to ensure that the chamber 24 is not put under pressure so long as the orifice 26 is not closed. This modification is particularly applicable in the case of valve members having a wide edge. The operation and the advantages of this modification are the same as in the case of the preceeding modification. However, it should be mentioned that the fact of having only one orifice in the sealing element enables the orifice to be disposed very close to the ring 18 and thus decreasing to the maximum extent the inner surface of the sealing element which is subjected to the upstream pressure when the valve is closed.

The embodiment shown in FIG. 9 concerns the application of the invention to a valve of the type in which a sealing element 35 is carried, not by the body 1$^b$ of the valve, but by the peripheral portion of the butterfly valve member 3$^b$. In this case, the body 1$^b$ of the valve has a ring seat 36 which is in one piece with the body and slightly inclined in order to allow the sealing element 35 to come into contact therewith with the minimum of friction and to facilitate the release of the valve member when opening the valve. The fluid of the piping flows, when the valve is open, in the direction of arrow $f$, the valve being closed by rotation of the valve member in the direction of arrow $g1$. The sealing element 35 here has a shape which is inverted with respect to that of the preceding embodiments, namely the narrowest part for providing the valving contact is here located near to the outer periphery of the sealing element and not near to the inner periphery thereof. This sealing element is provided with a single radially disposed orifice 37 and the cavity for receiving the sealing element is defined by an annular recess 38 provided in the upstream surface of the valve member 3$^b$ and by a recess 39 formed in the downstream surface of a clamping ring 40 applied against this upstream surface. The radially inner end of the cavity receiving the sealing element 35 defines with the inner surface of the latter an annular chamber 41 communicating with the upstream part of the valve body by way of a conduit 42 whose diameter is less than the diameter of the orifice 37 formed in the sealing element 35. In order to ensure that the chamber 41 is fluidtight, the ring 40 is applied and fixed against the valve member 3$^b$ with interposition of an annular sealing element 43 placed inside a corresponding groove 44 in the upstream surface of the valve member 3$^b$. When mounted, the ring 40 can be considered as being part of the valve member of the valve.

This arrangement operates in the following manner:

When the valve is open, the fluid flows in the direction of arrow $f$ and enters the conduit 42 and issues therefrom by way of the larger-section orifice 37 in the sealing element 35 : the chamber 41 is not subjected to pressure and the sealing element 35 is in the state of rest. When the outlet of the orifice 37 comes in contact with the seat 36 and is closed thereby, the fluid can no longer escape from the chamber 41 and the latter is put under pressure and causes the radial expansion of the sealing element 35 in the direction of the seat 36. The butterfly valve member then closes the valve in a sealed manner.

The embodiment shown in FIG. 10 differs from the preceding embodiment in that the orifice 37 of the sealing element is replaced by a conduit 45 formed in the valve member roughly in facing relation to the conduit 42 of the ring 40 and having a diameter greater than the conduit 42. The valve body, whose seat 36$^a$ is here cylindrical, is provided downstream of the seat with an abutment 46 provided with a flexible thrust washer 47 which is adapted to come in contact with the valve member in the region of the outlet of the conduit 45 and closes the latter when the valve is closed. Thus, when the valve member comes in contact (direction of rotation $g$) with the trust washer 47, the chamber 41 is put in communication solely with the upstream part of the valve by way of the conduit 42 and is pressurized and this expands the sealing element and applies it in a sealed manner against the seat 36$^a$. Inversely, when the valve member comes away from the abutment 46, the pressure drops in the chamber 41 and the valve member can be displaced with a low actuating torque.

Note that in the embodiments shown in FIGS. 7-10 the conduits or orifices may be formed by way of a modification at a diametrally opposed point since it is ensured that the chamber 24 or 41 is put under pressure only when the edge of the valve member closes, in its fully closed position, one of the two conduits or orifices.

Having now described my invention what I claim as new and desire to secure by Letters Patent is:

1. In a butterfly valve comprising a part in the form of a valve body and a part in the form of a butterfly valve member, means defining a fluid passageway extending throughout the body, the valve member being rotatable about an axis in said passageway between an extreme valve passageway closing position and an extreme valve passageway opening position, the passageway having an upstream inlet end for the inlet of the fluid and a downstream outlet end for the fluid, one of said two parts having an annular cavity, an annular sealing element disposed in the cavity with an inner end of which cavity the sealing element defines an annular chamber, said one part and said sealing element constituting a unit and the other of said parts defining an annular surface for sealing contact with the sealing element in said extreme valve passageway closing position of the valve member, means for retaining the sealing element in the cavity, said unit defining a conduit which is capable of acting as an inlet and exists permanently irrespective of the position of the valve member and irrespective of the state of the sealing element and extends from the chamber to said passageway and is located longitudinally of said passageway on a side of the valve member adjacent said upstream inlet end of the passageway and is open to said passageway irrespective of the state of the sealing element when the valve member is in said extreme valve passageway closing position so as to enable the chamber to receive the fluid pressure which prevails on the side of the valve member adjacent said upstream inlet end of the passageway; the improvement comprising means defining a conduit in said unit and capable of acting as an outlet and permanently extending from said annular chamber to said passageway and positioned relative to said other part to be closed off from said passageway downstream outlet end by said other part when the valve member is in said extreme closing position and to be put by said other part in communication with said passageway outlet end and thereby relieve the pressure in said chamber when and only when the valve member has been rotated away from said extreme closing position about said axis but before said annular surface has lost contact with said sealing element in a part of said valve member which is the most remote from said axis transversely of said passageway and located adjacent said downstream outlet end of the passageway in said extreme valve passageway opening position of the valve member, said conduit capable of acting as an outlet being in a region of said unit which is the most remote from the axis of rotation of the valve member transversely of said passageway and is located on the side of an immediately adjacent portion of the valve member which is adjacent said outlet end of said passageway when the valve member is in the vicinity of said extreme valve passageway closing position.

2. In a butterfly valve comprising a part in the form of a valve body and a part in the form of a butterfly valve member, means defining a fluid passageway extending throughout the body, the valve member being rotatable about an axis in said passageway between an extreme valve passageway closing position and an extreme valve passageway opening position, the passageway having an upstream inlet end for the inlet of the fluid and a downstream outlet end for the outlet of the fluid, one of said two parts having an annular cavity, an annular sealing element disposed in the cavity with an inner end of which cavity the sealing element defines an annular chamber, said one part and said sealing element constituting a unit and the other of said parts defining an annular surface for sealing contact with the sealing element in said extreme valve passageway closing position of the valve member, means for retaining the sealing element in the cavity, said unit defining a conduit which is capable of acting as an inlet and exists permanently irrespective of the position of the valve member and irrespective of the state of the sealing element and extends from the chamber to said passageway and is located longitudinally of said passageway on a side of the valve member adjacent said upstream inlet end of the passageway and is open to said passageway irrespective of the state of the sealing element when the valve member is in said extreme valve passageway closing position so as to enable the chamber to receive the fluid pressure which prevails on the side of the valve member adjacent said upstream inlet end of the passageway; the improvement comprising means defining a conduit in said unit and capable of acting as an outlet and permanently extending from said annular chamber to said passageway and positioned relative to said other part to be closed off from said passageway downstream outlet end by said other part when the valve member is in said extreme closing position and to be put by said other part in communication with said passageway downstream outlet end and thereby relieve the pressure in said chamber when and only when the valve member has been rotated away from said extreme closing position about said axis but before said annular surface has lost contact with said sealing element in a part of said valve member which is the most remote from said axis transversely of said passageway and located adjacent said downstream outlet end of the passageway in said extreme valve passageway opening position of the valve member, said conduit capable of acting as an outlet being located substantially at a point which is the most remote from the axis of rotation of the valve member transversely of said passageway and is located on the side of an immediately adjacent portion of the valve member which is adjacent said outlet end of said passageway when the valve member is in the vicinity of said extreme valve passageway closing position and slightly opens said passageway.

3. In a butterfly valve comprising a part in the form of a valve body and a part in the form of a butterfly valve member, means defining a fluid passageway extending throughout the body, the valve member being rotatable about an axis in said passageway between an extreme valve passageway closing position and an extreme valve passageway opening position, the passageway having an upstream inlet end for the inlet of the fluid and a downstream outlet end for the outlet of the fluid, one of said two parts having an annular cavity, an annular sealing element disposed in the cavity with an inner end of which cavity the sealing element defines an annular chamber and the other of said parts defining an annular surface for sealing contact with the sealing element in said extreme valve passageway closing position of the valve member, means for retaining the sealing element in the cavity, means defining a conduit which exists permanently irrespective of the position of the valve member and irrespective of the effect of fluid pressure on the sealing element and extends from the chamber to said passageway and is located longitudinally of said passageway on a side of the valve member adjacent said upstream inlet end of the passageway and is open to said passageway irrespective of the effect of fluid pressure on the sealing element when the valve member is in said extreme valve passageway closing position so as to enable the chamber to receive the fluid pressure which prevails on the side of the valve member adjacent said upstream inlet end of the passageway; the improvement comprising locating said conduit in said sealing element in a position to be put by said other part in communication with said passageway downstream outlet end and thereby relieve the pressure in said chamber when and only when the valve member has been rotated away from said extreme closing position about said axis but before said annular surface has lost contact with said sealing element in a part of said valve member which is the most remote from said axis transversely of the passageway and located adjacent said downstream outlet end of the passageway in said extreme valve passageway opening position of the valve member, said conduit being located in a region of the periphery of said sealing element which is the most remote from said axis transversely of said passageway, said region being situated on a side of said valve member which is adjacent said downstream outlet end of the passageway when the valve member is in the vicinity of said extreme valve passageway closing position and slightly opens said passageway.

4. A valve as claimed in claim 3, wherein said conduit has an oblong section which is elongated longitudinally of said passageway, the dimension of the conduit being greater than the dimension of said surface of contact longitudinally of said passageway so that only a part of said conduit is located on the side of the valve member adjacent said inlet upstream end of the passageway in said extreme valve passageway closing position and another part of said conduit is located on a side of said valve member which is adjacent said downstream outlet end of the passageway when the valve member is in the vicinity of said extreme valve passageway closing position.

5. A valve as claimed in claim 1, wherein the conduits are located in the sealing element in a common plane perpendicular to said axis of rotation and on the same side of said axis of rotation, the conduit capable of acting as an outlet being disposed in such manner as to be closed by said surface of contact when the valve member is in said extreme valve passageway closing position, the dimension of a portion of the sealing element between the two conduits being greater than the dimension of said surface of contact longitudinally of said passageway.

6. In a butterfly valve comprising a part in the form of a valve body and a part in the form of a butterfly valve member, means defining a fluid passageway extending throughout the body, the valve member being rotatable about an axis in said passageway between an extreme valve passageway closing position and an extreme valve passageway opening position, the passageway having an upstream inlet end for the inlet of the fluid and a downstream outlet end for the outlet of the fluid, one of said two parts having an annular cavity, an annular sealing element disposed in the cavity with an inner end of which cavity the sealing element defines an annular chamber, said one part and said sealing element constituting a unit and the other of said parts defining an annular surface for sealing contact with the sealing element in said extreme valve passageway closing position of the valve member, means for retaining the sealing element in the cavity, said unit defining a conduit which is capable of acting as an inlet and exists permanently irrespective of the position of the valve member and irrespective of the state of the sealing element and extends from the chamber to said passageway and is located longitudinally of said passageway on a side of the valve member adjacent said upstream inlet end of the passageway and is open to said passageway irrespective of the state of the sealing element when the valve member is in said extreme valve passageway closing position so as to enable the chamber to receive the fluid pressure which prevails on the side of the valve member adjacent said upstream inlet end of the passageway; the improved comprising means defining a conduit in said unit and capable of acting as an outlet and permanently extending from said annular chamber to said passageway and positioned relative to said other part to be closed off from said passageway downstream outlet end by said other part when the valve member is in said extreme closing position and to be put by said other part in communication with said passageway downstream outlet end and thereby relieve the pressure in said chamber when and only when the valve member has been rotated away from said extreme closing position about said axis but before said annular surface has lost contact with said sealing element in a part of said valve member which is the most remote from said axis transversely of said passageway and located adjacent said downstream outlet end of the passageway in said extreme valve passageway opening position of the valve member, said cavity being formed in the valve body and said conduit capable of acting as an inlet being formed in said body, the conduit capable of acting as an outlet extending through the sealing element and being so disposed as to be closed by said surface of contact when the valve member is in said extreme valve passageway closing position, said conduit capable of acting as an outlet being in a region of said unit which is the most remote from the axis of rotation of the valve member transversely of said passageway and is located on the side of an immediately adjacent portion of the valve member shich is adjacent said outlet end of said passageway when the valve member is in the vicinity of said extreme valve passageway closing position and slightly opens said passageway.

7. In a butterfly valve comprising a part in the form of a valve body and a part in the form of a butterfly valve member, means defining a fluid passageway extending throughout the body, the valve member being rotatable about an axis in said passageway between an extreme valve passageway closing position and an extreme valve passageway opening position, the passageway having an upstream inlet end for the inlet of the fluid and a downstream outlet end for the outlet of the fluid, one of said two parts having an annular cavity, an anular sealing element disposed in the cavity with an inner end of which cavity the sealing element defines an annular chamber, said one part and said sealing element constituting a unit and the other of said parts defining an annular surface for sealing contact with the sealing element in said extreme valve passageway closing position of the valve member, means for retaining the sealing element in the cavity, said unit defining a conduit which is capable of acting as an inlet and exists permanently irrespective of the position of the valve member and irrespective of the state of the sealing element and extends from the chamber to said passageway and is located longitudinally of said passageway on a side of the valve member adjacent said upstream inlet end of the passageway and is open to said passageway irrespective of the state of the sealing element when the valve member is in said extreme valve passageway closing position so as to enable the chamber to receive the fluid pressure which prevails on the side of the valve member adjacent said upstream inlet end of the passageway; the improvement comprising means defining a conduit in said unit and capable of acting as an outlet and permanently extending from said annular chamber to said passageway and positioned relative to said other part to be closed off from said passageway downstream outlet end by said other part when the valve member is in said extreme closing position and to be put by said other part in communication with said passageway downstream outlet end and thereby relieve the pressure in said chamber when and only when the valve member has been rotated away from said extreme closing position about said axis but before said annular surface has lost contact with said sealing element in a part of said valve member which is the most remote from said axis transversely of said passageway and located adjacent said downstream outlet end of the passageway in said extreme valve passageway opening position of the valve member, said cavity being formed in the valve member and the conduit capable of acting as an inlet being formed in the valve member and the conduit capable of acting as an outlet being disposed in such manner as to be closed when the valve member is in said extreme valve passageway closing position and said conduit capable of acting as an outlet being located in a region of said valve member which is the most remote from said axis of rotation and is the nearest to said downstream outlet end when said valve member is in said extreme opening position.

8. A valve as claimed in claim 7, wherein said conduit capable of acting as an outlet is formed in the valve member and is adapted to be closed by said surface of contact.

9. A valve as claimed in claim 7, wherein the conduit capable of acting as an outlet is formed in the valve member and a fixed abutment carried by the valve body is capable of closing the conduit capable of acting as an outlet when the valve member is in said extreme valve passageway closing position.

10. A valve as claimed in claim 1, wherein the conduit capable of acting as an outlet has a larger section than the conduit capable of acting as an inlet.

11. A valve as claimed in claim 1, wherein said sealing element retaining means comprise an L-sectional shape of the sealing element, and an annular recess in a lateral surface of said cavity, a branch of the L-section being engaged in the annular recess.

12. A valve as claimed in claim 11, wherein an additional recess of smaller section than the annular recess is formed in an inner end of the annular recess.

13. A valve as claimed in claim 11, wherein the retaining means further comprise grooves formed in lateral walls of said cavity.

* * * * *